US007869792B1

(12) United States Patent
Zhou et al.

(10) Patent No.: US 7,869,792 B1
(45) Date of Patent: Jan. 11, 2011

(54) HANDSET BASED DYNAMIC PARENTAL CONTROLS

(75) Inventors: Tong Zhou, Overland Park, KS (US); David Mohan, Overland Park, KS (US); Baoquan Zhang, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 905 days.

(21) Appl. No.: 11/717,758

(22) Filed: Mar. 13, 2007

(51) Int. Cl.
H04M 1/66 (2006.01)
H04W 12/00 (2009.01)

(52) U.S. Cl. ............... 455/411; 455/519; 455/414.3; 455/445; 455/420

(58) Field of Classification Search .................. None
See application file for complete search history.

(56) References Cited

U.S. PATENT DOCUMENTS

| 7,302,272 | B2 * | 11/2007 | Ackley ............... 455/414.1 X |
| 7,587,198 | B2 * | 9/2009 | Miller .................... 455/414.2 |
| 2005/0164687 | A1 | 7/2005 | DiFazio |
| 2005/0282589 | A1 | 12/2005 | Barneah |
| 2006/0121951 | A1 | 6/2006 | Perdomo et al. |
| 2006/0133414 | A1 | 6/2006 | Luoma et al. |
| 2006/0293057 | A1 * | 12/2006 | Mazerski et al. ............ 455/445 |
| 2008/0146211 | A1 * | 6/2008 | Mikan et al. ................ 455/419 |

OTHER PUBLICATIONS

Bluetooth Specification Version 1.1, Part K:3 Cordless Telephony Profile, Feb. 22, 2001.
Bluetooth Specification Version 1.1, Part F:3 Telephony Control Protocol Specification TCS Binary, Feb. 22, 2001.
Steve Karty, Bluetooth Personal Area Network Technology, Office of the manager National Communications System, Technology Notes, Technology and Programs Division vol. 7, No. 3, Jul. 2000.
Mobileman, IST-2001-38113, Mobile Metropolitan Ad hoc Networks, Dec. 2002.
Mobile Office Technology, "How to Use a Bluetooth Enabled Cell Phone", http://mobileoffice.about.com/od/typesofaccessavailable/ht/bluetooth..., printed from the world wide web on Jan. 17, 2007.
Brian McConnell, "SMS Relay—An Idea for Fault-Tolerant Communications", O'Reilly Wireless DevCenter, Sep. 28, 2001.
Claudio Lavecchia et al., "Real Life Experience of Cooperation Enforcement Based on Reputation (CORE) for MANETs".

(Continued)

Primary Examiner—Philip J Sobutka

(57) ABSTRACT

A parent mobile station is provided that enables real-time parental control over communications with an associated child mobile station. The parent mobile station receives notification of attempted inbound and outbound calls with third parties to and from the child mobile station, or of requests from the child mobile station to retrieve content from a content provider. In response to the notifications, the parent mobile station determines whether or not to permit the inbound and outbound calls or the retrieval of content. If permitted, communications with the child mobile station are routed through the parent mobile station, which itself communicates over a wireless telecommunications network. If not permitted, the parent mobile station does not relay such communications. The child mobile station preferably communicates with the parent mobile station using a wireless local area network (WLAN) or Bluetooth protocol and is preferably incapable of defeating the parental controls with a direct connection to the wireless telecommunications network.

19 Claims, 7 Drawing Sheets

OTHER PUBLICATIONS

Planet Networking & Communication, "SIP Proxy Server", 2005.
Planet Networking & Communication, SIP-50 SIP Proxy Server User's Manual, Rev: 1.0 (May, 2005).
Durga Pandey et al., "Voice Mesh Progress Report", Viral Communications MIT Media Lab, Nov. 18, 2005.
Durga Pandey et al., "Fluid Voice", Viral Communications MIT Media Lab, Jan. 18, 2006.
Mobileman IST-2001-38113, "MobileMAN Presentation", Mobile Metropolitan Ad hoc Networks, Jul. 2005.
R. Bernasconi et al., "Experiments with an enhanced MAC architecture for multi-hop wireless networks", MobileMAN project.
Nicolas Boulicault et al., "Experiments of Ana4: An Implementation of a 2.5 Framework for Deploying Real Multi-hop Ad hoc and mesh Networks".
Marc Heissenbuttel et al., "GNU/Linux Implementation of a Position-based Routing Protocol".
Minmin Tu et al., "Implementation Strategies for a Secure and Efficient Multi-hop MANET Platform".
Francesca Cuomo et al., "A linux based Bluetooth scatternet formation kit: from design to performance results".
Franca Delmastro et al., "An Experimental Study of P2P Group-Communication Applications in Real-World MANETs".
Alan Lim et al., "A Comparative Study of Cooperative Algorithms for Wireless Ad Hoc Networks".
Evgeny Osipov et al., "A Path Density Protocol for MANETs".
Christian Rohner et al., "Interactions between TCP, UDP and Routing Protocols in Wireless Multi-hop Ad hoc Networks".
Marina Petrova et al., "Hop of No Return: Practical Limitations of Wireless Multi-Hop Networking".
Wolfgang Kieβ et al., "Thoughts on Mobile Ad-hoc Network Testbeds".
Peter Barron et al., "Experiences Deploying an Ad-hoc Network in an Urban Environment".
Luigi Iannone et al., "MeshDV: A Distance Vector mobility-tolerant routing protocol for Wireless Mesh Networks".
Claudia Brazzola, "Social networks, novel communication applications and needs in mobile contexts".
George Roussos, "On the Dimensionality of Wireless Connectivity Traces".
Marco Conti et al., "Cross-Layer Support for Group-Communication Applications in MANETs".
R. Bruno et al., Experimenting a Layer 2-based Approach to Internet Connectivity for Ad Hoc Networks.
Nicolas Boulicault et al., "Demo of Ana4: an Hybrid Local Area Ad hoc Network Architecture".
Pan Hui et al., "Haggle Architecture and Demo of its Real World Implementations".
Martin Nielsen, "Demo of residual bandwidth estimation in an 802.11 ad hoc network".
Cyclop3 Internet Filtering Proxy, "User Guide," printed from the World Wide Web on Mar. 1, 2007.
PC Chaperone by Precipice Softward, "PC Chaperone Features," 2007.
Net Orbit—Network Supervision Software, "Net Orbit—User Guide," 2007.
[Content] watch Internet Protection, "ContentProtect Professional Suite Administrator's Guide," Dec. 2006.
[Content] watch Internet Protection, "Net Nanny Home Suite User Guide," Feb. 2007.

* cited by examiner

HANDSET BASED DYNAMIC PARENTAL CONTROLS

BACKGROUND

This disclosure relates to wireless communications and, in particular, to parental control over wireless voice communications.

The instant access to global communications afforded by wireless networking has been shown to have almost immeasurable value. The technologies that allow people to access enormous amounts of information and to communicate instantly with others, though, can easily be misused. For example, it is of particular concern that children not be permitted access to adult-oriented Internet sites, and, conversely, untrustworthy adults should not be permitted to contact children over such networks. Moreover, even when children's use of network resources is proper, it can be excessive, as children are known to incur excessive connection charges, often paid by their parents.

Numerous efforts have been made to restrict children's access to various network resources. For example, software programs and proxy servers have been used to limit both the scope and duration of children's access to the Web. Child-specific mobile telephones, such as the TicTalk™ or the Firefly®, similarly allow parents to impose limitations as to who children are permitted to speak with, and for how long.

Many innovations have been made using network protocols used for voice communications. For example, voice communications may be carried using a VoIP (Voice over Internet Protocol), wherein voice communications are digitized, packetized, and sent over the Internet and/or a LAN (Local Area Network). Such communications may be set up through the use of the session initiation protocol (SIP). SIP proxy servers are available to provide client registration, authentication, and administration for VoIP endpoints. One such proxy server is the SIP-50 proxy server offered by Planet Networking & Communication.

Various network topographies have been explored for voice and data communications. For example, it has been proposed that such communications may be carried over a mesh or ad-hoc network. In such networks, data packets are wirelessly routed from node to node in a mesh. This enables nodes within the mesh to communicate with one another. Because individual nodes can act as repeaters for other nodes in the mesh, two nodes may be in communication with one another even if they are out of range of direct radio frequency (RF) communications. If one or more of the nodes in the mesh has access to an outside network, such as a public switched telephone network (PTSN) or the Internet, other nodes in the mesh may also communicate with the outside network, using the node to relay communications to and from the outside network.

Telephonic voice communications are often carried out with the use of a wireless hands-free headset. In the operation of such a headset, a user's mobile station establishes short-range wireless communications with the headset using a personal area network (PAN) protocol such as Bluetooth. Voice communications are carried wirelessly between the facilities of a telecommunications service provider and the mobile station using a wireless telecommunications protocol such as, for example, CDMA (Code-Division Multiple Access) or GSM (Global System for Mobile Communications). The mobile station relays these voice communications to a nearby headset, which includes audio transducers through which audible speech is digitized and played back.

Telecommunications equipment providers have envisioned the use of a "personal phone hub" or "personal mobile gateway" (PMG). Such a gateway serves as a single point of contact between an individual and a wireless telecommunications network. When an individual is equipped with compatible accessory nodes, such as a PDA (Personal Digital Assistant) or telephone handset or headset, the accessory nodes communicate with the wireless telecommunications network through the gateway. In this way, the compatible accessories can expend only a small amount of power communicating with the nearby gateway, rather than the larger amount of power that would be necessary to communicate directly with, for example, a more distant base transceiver station (BTS) of a wireless telecommunications network.

One partial implementation of the personal mobile gateway concept is the use of a Bluetooth-enabled mobile telephone to serve as a "wireless modem" to provide an Internet connection for a nearby Bluetooth-enabled laptop computer. To avoid unauthorized use of one's mobile telephone to establish an Internet connection, the mobile telephone generally prompts its user for authorization to accept such a connection.

In this rapidly-advancing world of wireless communications, it is expected to become ever more difficult for parents to protect and exercise control over their children who have access to such communications.

SUMMARY

A parent mobile station is provided that enables parental control over communications with at least one associated child mobile station. In a preferred embodiment, the parent mobile station receives requests for inbound and outbound calls with third parties to and from the child mobile station. In response to the requests, the parent mobile station determines whether or not to permit the inbound and outbound calls. The determination may be made automatically and/or with real-time input from a user of the parent mobile station. If a call is permitted, voice communications between the third party and the child mobile station are routed through the parent mobile station. The parent mobile station preferably communicates with the third party through a wireless telecommunications network. If a call is not permitted, the parent mobile station does not relay such communications. The child mobile station preferably communicates with the parent mobile station using a wireless local area network (WLAN) or Bluetooth protocol, and the child mobile station is preferably incapable of defeating the parental controls by establishing a direct connection to the wireless telecommunications network.

DETAILED DESCRIPTION

A. Overview of One Exemplary Embodiment

Figure 1:
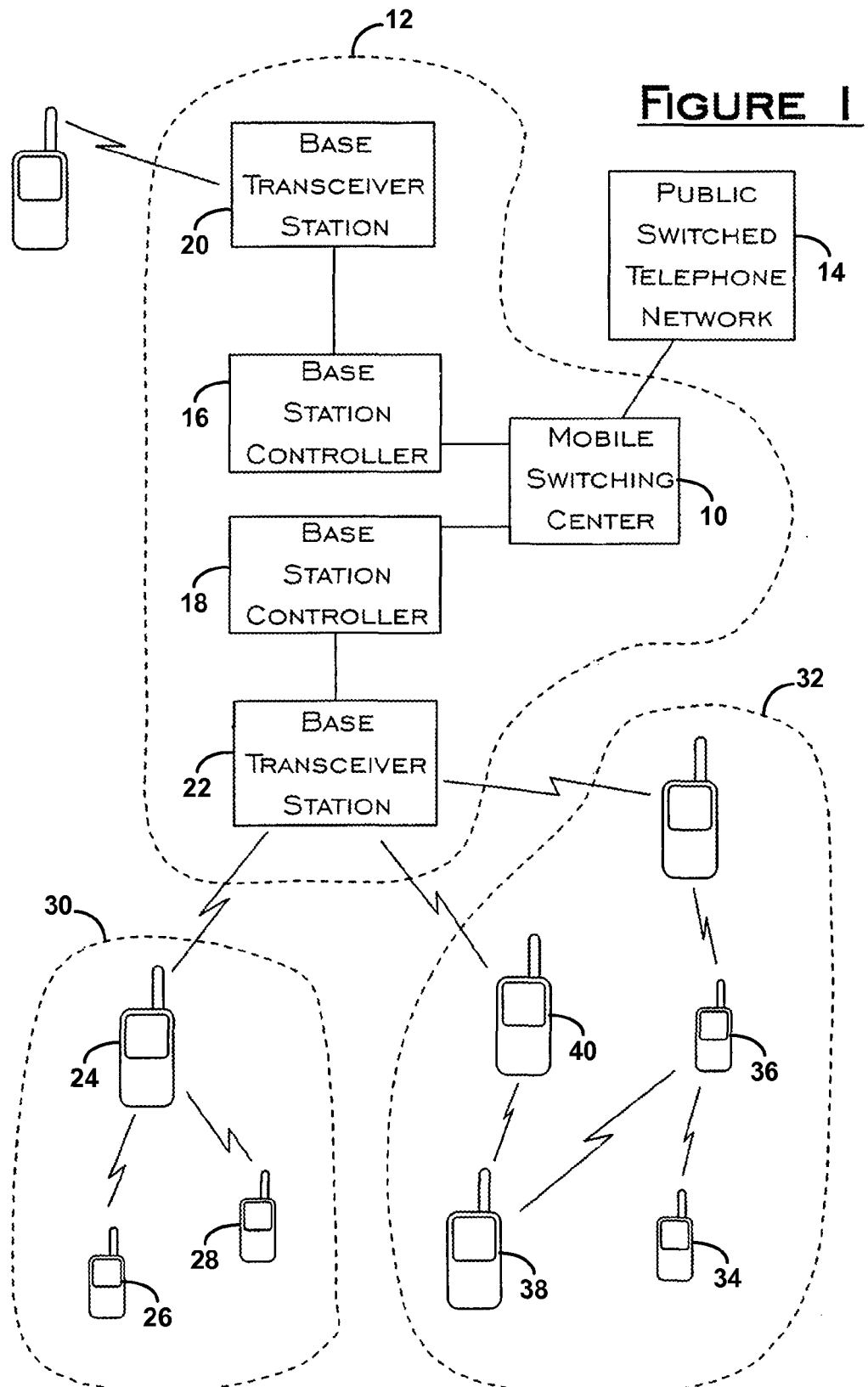
FIG. 1 is a schematic diagram of a network architecture including a wireless telecommunications network and a plurality of parent and child mobile stations.

In an exemplary embodiment of a mobile communications parental control system, a parent is provided with a parent mobile station capable of communicating directly over a wireless telecommunications network, such as a CDMA network. A child is provided with a child mobile station that is not capable of communicating directly over the wireless telecommunications network. Instead, the child mobile station is capable of communicating with the wireless telecommunications network only through the parent mobile station. To communicate over the wireless telecommunications network, the child mobile station establishes two-way wireless voice communications with the parent mobile station, and the parent mobile station establishes two-way wireless voice communications with the wireless telecommunications network. The parent mobile station relays voice communications between the child mobile station and the wireless telecommunications network. In this way, the child is able to communicate wirelessly with others on, for example, the public switched telephone network (PSTN) without having a direct physical link to the wireless telecommunications network. For example, the child mobile station may not be provided with the RF circuitry necessary to establish radio communications with base transceiver stations of the wireless telecommunications network, or the child mobile station may not be associated with any active account, so that attempts to register on a wireless telecommunications network would be unsuccessful.

As communications from the child mobile station are routed through the parent mobile station, the parent is able to exercise direct control over the child's communications. In particular, it is preferred that at least a substantial portion—and preferably all—of the voice data exchanged in a connection between a child mobile station and a third party is routed through the parent mobile station. That is, the voice data itself, not merely signaling data used to set up a call, is conveyed through the parent mobile station.

The restrictions implemented by a parent mobile station may be implemented in a variety of ways. Restrictions may be preset, such that any call from the child mobile station, or any call made from an outside caller to reach the child mobile station, will not be successful in establishing a connection unless the call satisfies preset conditions. The preset conditions may include the identities of authorized and/or unauthorized telephone numbers for inbound and/or outbound calls, and the amount of time the child has spent using the mobile station (which may be reset on a periodic, e.g. monthly, basis). Restrictions may be made on a call-by-call basis, in which information about an inbound and/or outbound call is displayed on the parent mobile station, giving the parent an opportunity to permit or to block a connection. In some instances, a parent may optionally act as an "operator," speaking to an inbound caller before determining whether to relay the connection to the child mobile station. Other restrictions may be made in mid-connection. For example, if a child has exceeded the permissible amount of time using the mobile station (either cumulatively or in the present connection), the call may be disconnected, either automatically or by providing call information to the parent, who can decide whether or not to terminate the call. The parent may be provided with the capability of breaking into an active connection, for example to notify the child that he or she is exceeding his or her allotted time.

Preferably, communications between the parent and the child mobile station are conducted using a wireless local area network (WLAN) protocol, such as an IEEE 802.11 protocol, or a wireless personal area network (PAN), such as Bluetooth.

In alternative embodiments, the child mobile station may actually be capable of directly establishing communications over the wireless telecommunications network. In these embodiments, restrictions may be implemented on the child's access to the wireless telecommunications network, such as restrictions on the number of minutes the child can use the mobile station, or whitelist and/or blacklist restrictions on inbound and outbound calls. In other embodiments, the child mobile station may be able to access only particular features of a wireless telecommunications network, such as data services (e.g., an Internet connection) and/or text messaging services, such as SMS (short message service) messaging.

B. Network Architecture

An exemplary network architecture used in the implementation of a mobile communications parental control system is illustrated in FIG. 1. A mobile switching center 10 of a wireless telecommunications service provider network 12 is in communication with the public switched telephone network 14. One or more base station controllers (BSCs) 16, 18 are associated with the mobile switching center 10. Each base station controller operates one or more base transceiver stations (BTSs) 20, 22. Preferably, the telecommunications network provides 12 conventional wireless telecommunications services with mobile stations that do not implement the parental controls disclosed herein.

At least one parent mobile station 24 and one or more child mobile stations 26, 28 are also provided. The parent mobile station 24 exchanges two-way voice communications with the base transceiver station 22, and the child mobile stations 26, 28 exchange two-way voice communications with the parent mobile station 24.

The parent and child mobile stations may be arranged as nodes in a hub-and-spoke architecture 30, with the parent mobile station serving as the hub. In such an arrangement, two-way voice communications between child mobile stations and the wireless telecommunications network are carried out through the parent mobile station without additional intervening nodes.

In an alternative embodiment, parent and child mobile stations are arranged in a mesh network architecture 32, which may be an ad-hoc network. In such an embodiment, a child mobile station, such as child mobile station 34, may communicate with the wireless telecommunications network through one or more other nodes in the mesh network, such as nodes 36 and 40, among others. The network protocol, however, is selected such that at least one of the nodes through which a child mobile station communicates is a parent mobile station, such as parent mobile station 38, that is associated with that child mobile station. This routing protocol may be enforced by, for example, encrypting communications to and from the child mobile station such that only a parent mobile station can decrypt those communications. In some embodiments, a mesh network architecture may be implemented concurrently with a hub and spoke architecture, and mobile stations may arrange themselves in different architectures depending on the proximity and communications capabilities of nearby mobile stations.

In an embodiment in which the parent and child mobile stations are a part of a mesh network, wherein at least one node in the mesh is capable of communicating with the service provider network, the parent mobile station itself need not have the ability to communicate directly with the service provider network (or, if the parent mobile station does have that ability, it need not make use of it).

In a preferred embodiment, communications between individual mobile stations (whether the mobile stations are communications endpoints or are relaying communications on behalf of other mobile stations) are carried out using a wireless protocol such as a Bluetooth protocol, an 802.11 protocol, or another other wireless LAN or PAN protocol. Communications conveyed between a mobile station and the service provider network (again, whether or not the mobile station is an endpoint of the communication) are preferably conveyed using a wireless telecommunications protocol such as an EVDO (Evolution-Data Optimized) or other CDMA protocol, or a GSM protocol.

Wireless communications between individual mobile stations are preferably carried out using an equivalent isotropically radiated power (EIRP) of less than one watt. Wireless communications from a mobile station to the wireless telecommunications network may be carried out using an EIRP of greater than or less than one watt, but mobile stations capable of establishing a direct link with the wireless telecommunications network preferably have the ability to transmit wireless communications at an EIRP of greater than one watt, though even with such an ability they need not always send such transmissions at more than one watt.

C. Mobile Station Functionality

1. Parent Mobile Station Functionality

Figure 2:
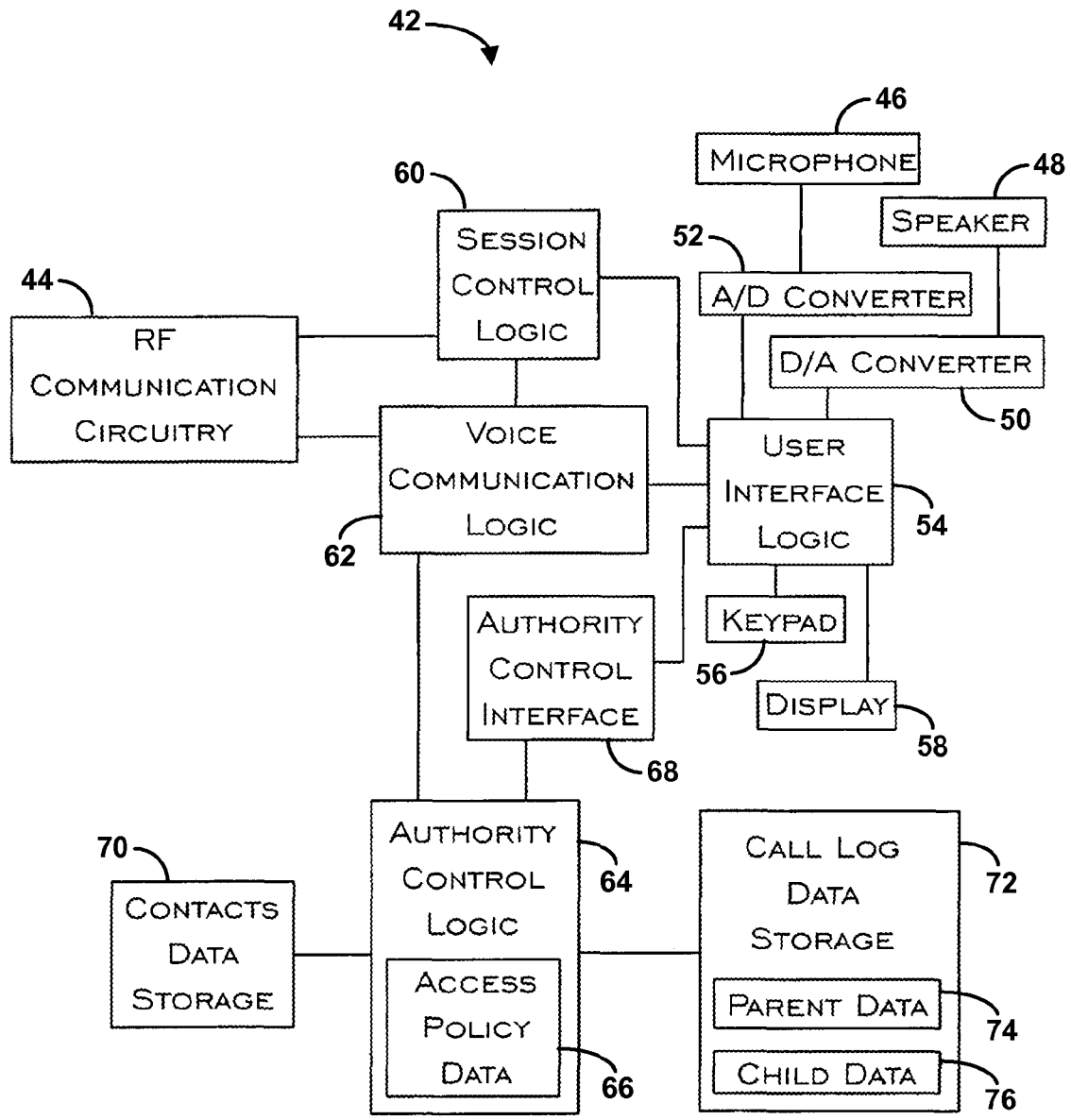
FIG. 2 is a schematic functional block diagram of a parent mobile station.

In one embodiment, illustrated in FIG. 2, a parent mobile station 42 is provided with wireless communications circuitry 44, which preferably includes one or more RF communications circuits, for conducting wireless communications with the service provider network and with one or more other mobile stations, such as a child mobile station. The parent mobile station is provided with transducers such as a microphone 46 and a speaker 48 to convert audio signals to electrical signals, and electrical signals to audio signals, respectively. The speaker and microphone are in communication with user interface logic 54 through, respectively, a digital-to-analog converter 50 and an analog-to-digital converter 52. A numeric or alphanumeric keypad 56 (whether physical or implemented virtually, such as on a touch screen) and display 58 are also in communication with the user interface logic. The user interface logic 54 provides device drivers for audio, visual, and tactile communications presented to and received from a user.

The parent mobile station is also provided with session control logic 60, which may be SIP logic or another session-layer logical interface. In a parent mobile station, the session control logic is operative to establish voice communications sessions with the wireless telecommunications network and with any child mobile station. The session control logic 60 is operative to establish voice communications in response to one or more of various occurrences, such as dialing or other selection of a telephone number by a user, signaling of an inbound call from the wireless telecommunications network, or a communications request from a child mobile station, among others. The parent mobile station 42 is preferably operable to enable telephone calls between the parent mobile station and other, conventional telephones and mobile stations over a wireless telecommunications network and/or the public switched telephone network.

The session control logic 60 and the user interface logic 54 both interface with voice communication logic 62. The voice communication logic 62 is an application-layer module supporting voice communications over sessions established by the session control logic. In some embodiments, voice communications may be encoded one way when exchanged with the wireless telecommunications network and another way when exchanged with a child mobile station. In such embodiments, the voice communication logic may include a conversion module to change between the two encoding protocols to relay voice communications between a child mobile station and the wireless telecommunications network. A network interface (not shown) may be employed to provide network layer functionality between the RF circuitry and the voice communication logic.

The parent mobile station is further provided with authority control logic 64 in communication with the session control logic 60 and/or the voice communication logic 62, to implement real-time and predetermined access policies for access by a child mobile station. Where access policies are configurable, the parent mobile station preferably stores access policy settings locally as access policy data 66. The authority control logic interfaces with the voice communication logic 62 and/or the session control logic to implement the access policies. For example the authority control logic 64 may instruct the session control logic 60 to disconnect or to fail to connect sessions that violate an access policy. With or without disconnection of communication sessions, the authority control logic 64 may instruct the voice communication logic 62 to discontinue relaying of communications between the wireless telecommunications network and the child mobile station, or to discontinue conversion of the encoding (including encryption, if applicable) of relayed communications, such that relayed communications are unintelligible. In instances where communication sessions are not immediately disconnected, the parent mobile station may be operative to send an audible message to the child mobile station and/or the party with whom the child mobile station is in communication, notifying of impending disconnection.

The parent mobile station is further provided with an authority control interface 68, which provides a software interface between the user interface logic 54 and the authority control logic 64. Through the authority control interface 68, a user of the parent mobile station can set predetermined controls over child mobile phone use, can be notified of the child mobile station's communication activities, and/or can activate control features in real time.

In a preferred embodiment, the authority control interface 68 provides the capability to present real-time notifications to a user of the parent mobile station, to return a user's response to such notifications, to access real-time and cumulative information on child mobile station use, and to set access policies. In one such embodiment, notifications are provided as pop-up notifications on a touch screen, offering a user an opportunity to permit or to deny a communication event relating to an associated child mobile station by selection of different areas on the touch screen. The notifications preferably indicate the identity (by telephone number, name, or both) of a party attempting to call the child mobile station, or of a party that the child mobile station is attempting to call. "Contacts" data 70 stored at the parent mobile station may be retrieved to provide a name associated with the telephone number. Other information provided to a user of the parent mobile station in a notification, or at other times, may be call history information, such as a call log stored in a call log data storage 72 at the parent mobile station. Preferably, the call log data storage 72 includes separate call log information for calls conducted with a user of the parent mobile station (parent data 74) versus calls conducted with a user of the child mobile station (child data 76). This separation may be a logical separation. As one example of such a logical separation, call log data for both the parent and child mobile station may be stored in a single data structure containing a plurality of entries, where each entry provides information on a single call, and wherein at least some of those entries include a field indicating whether that call was made with the parent mobile station or with the child mobile station. In this way, call log data for the parent and child is logically separate even if it is interleaved in a particular storage medium.

Figure 3:
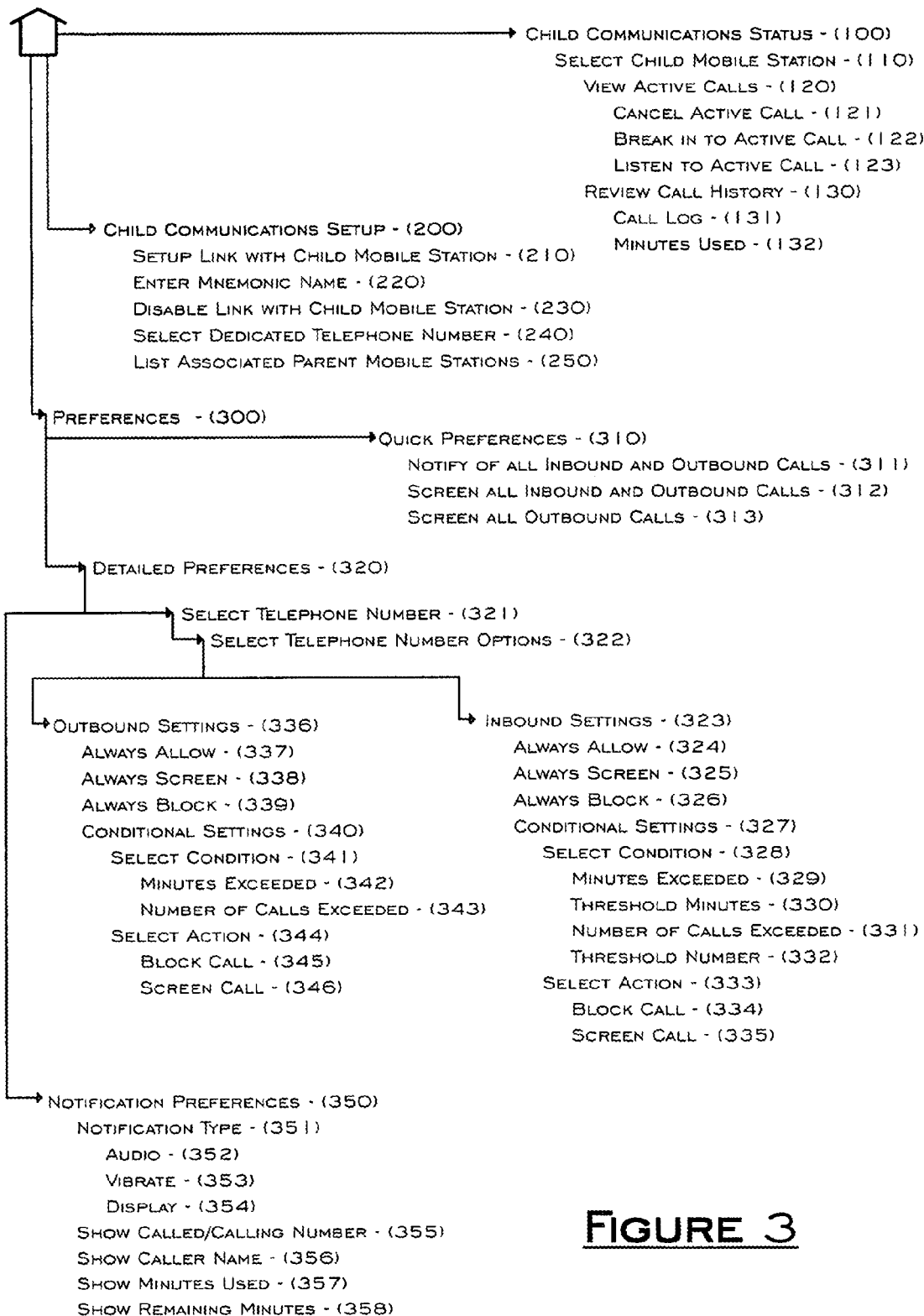
FIG. 3 is a tree structure diagram illustrating menu options for configuring the operations of a parent mobile station.

The authority control interface 68 preferably provides a menu-driven interface, offered on the display 58, for accessing real-time and cumulative information on child mobile station use and for setting access policies. An exemplary menu structure for such an interface is illustrated in FIG. 3. The menu structure illustrated in FIG. 3 is preferably implemented in addition to other, conventional menu items relating to use of the parent mobile station as a stand-alone mobile station for telephone calls between the parent mobile station and other, conventional telephones and mobile stations over a wireless telecommunications network and/or the public switched telephone network.

As illustrated in FIG. 3, the menu structure includes high-level selections entitled "Child Communications Status" 100, "Child Communication Setup" 200 and "Preferences" 300. By selecting "Child Communication Status," a user can review current and/or cumulative information about the use of associated child mobile stations. Under "Child Communication Setup," a user can associate or disassociate one or more child mobile stations with the parent mobile station and provide information useful in providing communication services for the child mobile station. Under "Preferences," a user can set notification and policy settings relating to authority exercised over child mobile station communications.

Through the "Child Communications Status" menu selection, a user selects the child mobile station (selection 110) for which it wishes to collect information. If only one child mobile station is associated with the parent mobile station, this menu level may not be necessary. For the selected child mobile station, a selection can be made to view information about any connection that is currently active at the child mobile station (selection 120), preferably a call that is being relayed through the parent mobile station. Given the information about the connection, if any, the parent mobile station may offer the options to cancel the connection (selection 121), to break into the connection (selection 122, allowing the user of the parent mobile station to speak with one or both of the parties on the connection), or to listen to the connection in progress (selection 123), subject to applicable laws.

The parent mobile station also provides the option to view call history (selection 130), such as a call log of the child mobile station's calls (selection 131) and/or the cumulative amount of time during which the child mobile station has had active connections (selection 132). The call history information accessible through this interface preferably displays only child mobile station calls, while parent mobile station calls are made accessible through a different menu option. The call history information is preferably cleared according to a default or configurable protocol. For example, the call history may store information only on the last fifty (or some other number) calls, and the amount of time (which may be a number of minutes used) may be cleared at the end of each billing cycle or at another configurable interval. Call history information is preferably stored at the parent mobile station.

The parent mobile station further provides a child communications setup menu selection (selection 200). This selection enables the mobile station to setup (selection 210) or disable (selection 230) associations with a child mobile station. Proximity to an un-associated child mobile station may trigger a parent mobile station to prompt its user as to whether it should associate itself with the child mobile station. If a child mobile station is identified with a hardware serial number or other difficult-to-remember designation, a user of the parent mobile station may enter a mnemonic (selection 220) associated with the child mobile station. In an embodiment in which the parent mobile station is assigned two or more telephone numbers, menu options on the parent mobile station preferably enable selective assignment of one or more of those telephone numbers to one or more of the child mobile stations (selection 240), such that calls to a child mobile station can be made over the public switched telephone network by dialing such an assigned telephone number, the success of such calls in establishing a connection being subject to the control exercised by the parent mobile station.

In some embodiments, each child mobile station may be associated with more than one parent mobile station, for example when a mother and father each have parent mobile stations through which a child mobile station may communicate. In such an embodiment, the menu may provide information on the other parent mobile stations, if any, associated with a particular child mobile station (selection 250). In this way, a parent can determine whether an unauthorized holder of a parent mobile station has attempted to gain authority over and/or access to a child's mobile station.

Through a high-level menu option, the parent mobile station enables review of and changes to the access policy settings (selection 300). For parent mobile station users uninterested in managing detailed policy settings, the mobile station may provide easy-to-use "quick preference" options (selection 310) such as "notify of all inbound and outbound calls" (selection 311), "screen all inbound and outbound calls" (selection 312), and "screen all outbound calls" (selection 313). Based on marketplace preferences, more complicated policy settings, such as those described below, may be pre-programmed as one of the "quick settings."

The parent mobile station may further provide the option to make detailed adjustments to the policy settings (selection 320). For example, policies may be made on a telephone number by telephone number basis to distinguish between various parties that may attempt to contact the child mobile station, or that the child mobile station may attempt to contact (selection 322). In such a case, the user can enter or select the relevant telephone number and apply the desired settings to that number. A separate selection may be provided for setting policies on handling calls to and from numbers that are otherwise not specifically listed. Alternatively, or in addition, wildcards or other regular-expression type features may identify sets of telephone numbers that should be treated identically. For example, inbound calls from telephone numbers with an "800," "866," or "888" area code may be blocked, while outbound calls to those area codes may be permitted. Calls to or from a telephone number whose area code and prefix together suggest an undesirable PBX exchange may be blocked or screened, even without identifying all extensions within the exchange.

Different policy settings may apply to inbound and outbound calls for any one telephone number. As for inbound call settings (selection 323), a call from the selected telephone number may always be allowed (selection 324), always be screened (selection 325), always be blocked (selection 326), or the handling of the inbound call can depend on preconfigured conditions (selection 327). Similarly, for outbound call settings (selection 336), a call from the selected telephone number may always be allowed (selection 337), always be screened (selection 338), always be blocked (selection 339), or the handling of the inbound call can depend on preconfigured conditions (selection 340).

If the handling of a call depends on preconfigured conditions, those conditions can be configured (selections 328, 341) by a user of the parent mobile station. Such conditions include determining if the child mobile station has spent an excess amount of time (colloquially "too many minutes") using the telephone during the current billing cycle (selections 329, 342), or has made or received too many telephone calls in a period (selections 331, 343). In either case, the parent mobile station can preselect the threshold number of minutes (selection 330) or number of calls (selection 332). A user of the parent mobile station can further be provided with the option of how to handle calls from a particular number of set of numbers if the condition is true (selections 333, 344). For example, once a condition becomes true, the parent mobile station can be instructed to block inbound and/or outbound calls (selections 334, 345), or it may be instructed to screen all such calls (selections 334, 345) such that parent permission in response to a notification is required before a connection can be established.

As one example of policies that may be set on a parent mobile station, a child mobile station may normally be permitted to initiate or receive calls without limitation, until it reaches a threshold number of minutes used during the current billing cycle. Typically, this threshold number of minutes might be the number of minutes that can be used each billing cycle without incurring overage charges. After the threshold number of minutes is reached, though, the child mobile station may be permitted to initiate or receive calls only from a select set (or whitelist) of callers, such as family members, a babysitter, or emergency personnel, among others.

A parent mobile station preferably at least provides notification of inbound and outbound calls from the child mobile station. In some embodiments, these notifications can be configured by the user of the parent mobile station (selection 350). In such embodiments, the user of the parent mobile station can select whether the notification will include an audible signal (selection 352), a vibration signal (selection 353), and/or a visual display (selection 354). The information conveyed in the display may be configurable to include the telephone number of the calling/called party (selection 355), the name of the calling/called party (if pre-stored or provided as Caller ID information) (selection 356), the number of minutes used by the child mobile station (selection 357), and the number of minutes remaining in the child mobile station's account (selection 358), among other information.

On a parent mobile station, a user may be provided with the option of how to handle calls that are not connected with the child mobile station (selection 360). For example, blocked calls may nevertheless be permitted to connect with a voice messaging service associated with the child mobile station (selection 362), or alternatively such calls may be canceled altogether (selection 363). The parent mobile station may also provide the option of enabling an operator mode (selection 361), in which the parent speaks to one or both parties before permitting a call to be connected with a child mobile station.

A displayed notification that a call is being made to or from a child mobile station is preferably in the form of a dialog box displayed on a touch screen of the parent mobile station. Display of this notification may, depending on user settings, may be accompanied by a vibration and/or auditory alert. An exemplary notification used for screening calls is illustrated in FIG. 4.

Figure 4:
FIG. 4 illustrates an exemplary incoming call notification, such as may be displayed on a parent mobile station.

In the notification of FIG. 4, a dialog box 80 displays information about an inbound caller, including the caller's name 82 and telephone number 84. The dialog box further displays one or more command buttons 86, 88 offering the user of the parent mobile station to permit a connection (by selecting button 88) or to cancel the inbound call (by selecting button 86). The notification may further include a reminder (not shown) of whether, absent timely action by the user of the parent mobile station, the call will be connected or will be canceled. An additional command button 90 may be provided that allows the parent to answer the call. In such a case, the parent, having answered the call, may subsequently be provided with the option of whether to forward the call to the child mobile station.

2. Child Mobile Station Functionality

Figure 5:
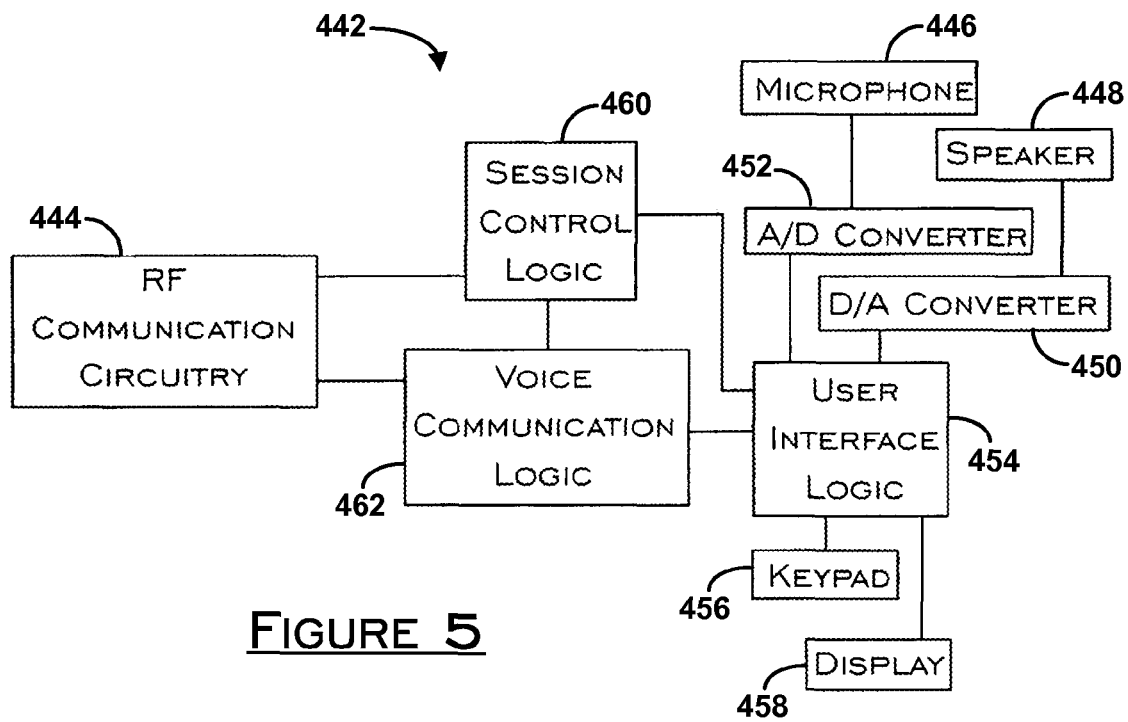
FIG. 5 is a schematic functional block diagram of a child mobile station.

One embodiment of a child mobile station is illustrated in FIG. 5. The child mobile station 442 is provided with an RF communications circuit 444 for conducting wireless communications with one or more other mobile stations, such as a parent mobile station 42 and, in some embodiments, with other child mobile stations. Preferably, the child mobile station is a "Part 15 device," operated under Part 15 of the Title 47 of the Code of Federal Regulations. Preferably, the child mobile station is not capable of transmitting an equivalent isotropically radiated power (EIRP) of more than one watt.

The child mobile station 442 is provided with a microphone 446 and a speaker 448 to convert audio signals to electrical signals, and electrical signals to audio signals, respectively. The speaker and microphone are in communication with user interface logic 454 through, respectively, a digital-to-analog converter 450 and an analog-to-digital converter 452. A keypad 456 (whether physical or implemented virtually, such as on a touch screen) and display 458 are also in communication with the user interface logic 454. The user interface logic provides device drivers for audio, visual, and tactile communications presented to and received from a user.

The child mobile station is also provided with session control logic 460, which may be SIP logic or another session-layer logical interface. In a child mobile station, the session control logic is operative to establish voice communications sessions with a parent mobile station and, in some embodiments, with other child mobile stations. The session control logic 460 is operative to establish voice communications in response to one or more of various occurrences, such as dialing or selection of a telephone number by a user, or notification of an inbound call, among others.

The session control logic 460 and the user interface logic 454 both interface with voice communication logic 462. The voice communication logic 462 is an application-layer module supporting voice communications over sessions established by the session control logic. A network interface (not shown) may be employed to provide network layer functionality between the RF circuitry and the voice communication logic.

The child mobile station may also be provided with authority control logic (not shown), in communication with the session control logic and/or the voice communication logic, to implement at least some access policies governing communications by the child mobile station. For example, the authority control logic may prevent the child mobile station from communicating directly, without intervening relays, with any parent mobile station not associated with the child mobile station. Alternatively, in a multi-hop network architecture, such as some mesh or ad hoc networks, the authority control logic may prevent the child mobile station from establishing a communications session over a path that does not include an associated parent mobile station, and/or the authority control logic may prevent the child mobile station from accepting data packets sent or over a path that does not include the associated parent mobile station. Although a parent mobile station bears the primary responsibility for enforcing access policies, the authority control logic of a child mobile station may mirror at least some of the access policy settings enforced by the parent mobile station. For example, the authority control logic of the child mobile station may be provided with information as to the number of minutes the child mobile station is permitted to use in each period. In this way, the user of a child mobile station attempting to make a call may be informed by the mobile station that he has exceeded the threshold number of minutes and that the call is not likely to be permitted. As a result, the user of the child mobile station is less likely to place demands on the parent mobile station, and its user, when a call is less likely to be permitted. The authority control logic may further report the outcome of attempted outbound calls from the child mobile station. For example, the authority control logic may report that an attempted call was blocked by parental controls, thereby discouraging a second attempt by the user of the child mobile station, who otherwise may have thought that the call failed because of network problems.

In some embodiments, the parent and child mobile stations may have identical hardware, but may be configured differently such that, for example, the child mobile station is permitted to communicate with the wireless telecommunications network only through an associated parent mobile station. These different configurations may be provided by, for example, different SIM or USIM ([Universal] Subscriber Identity Module) cards, different software, different information provided during provisioning, and/or other options.

D. An Exemplary Parental Control Method

1. An Outbound Call Method

Figure 6:
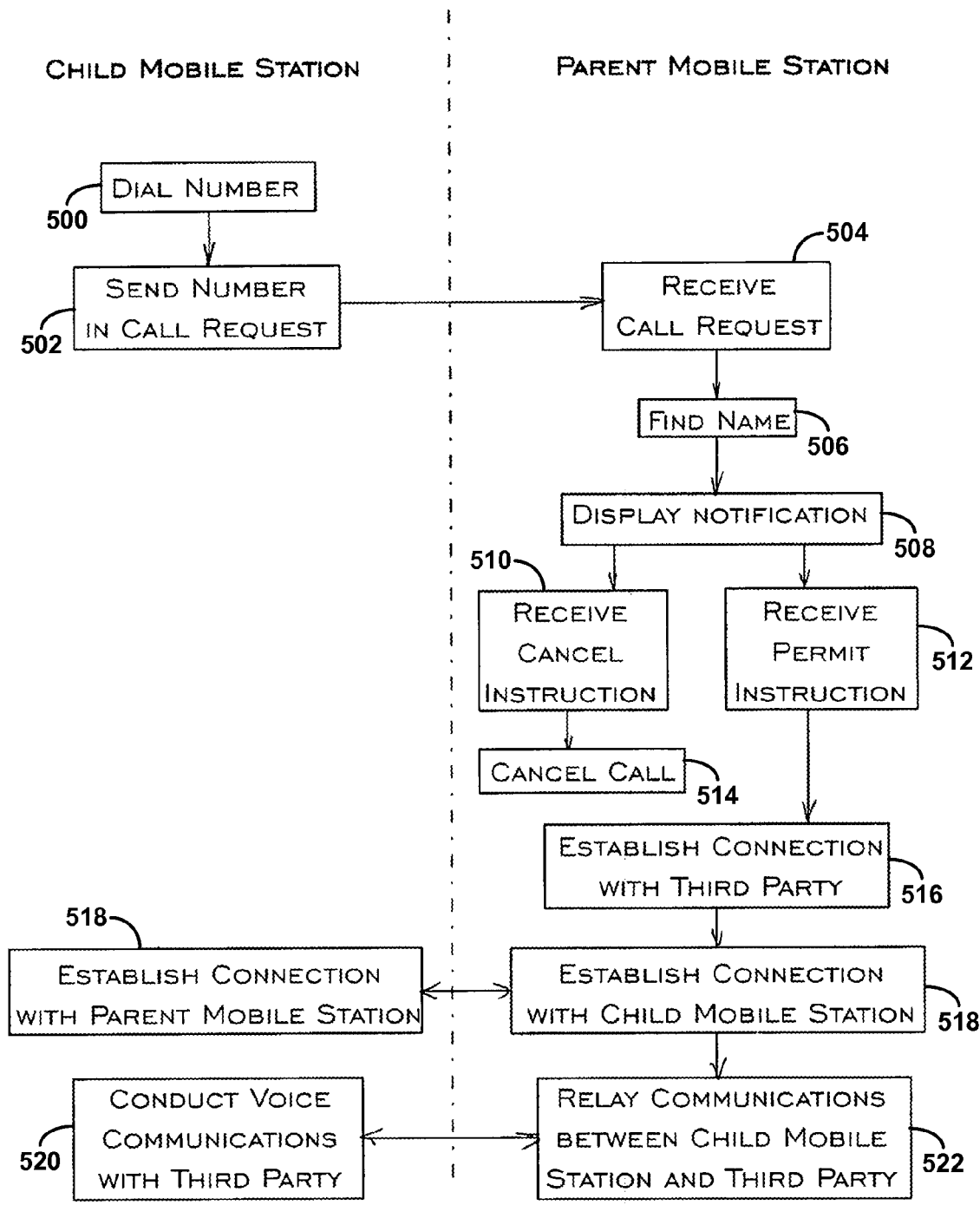
FIG. 6 illustrates a method performed by parent and child mobile stations in handling a requested outbound call.

As illustrated in FIG. 6, the user of a child mobile station dials a telephone number associated with a third party (step 500). The child mobile station transmits the telephone number to a parent mobile station in a call request (step 502). The parent mobile station receives the call request, including the telephone number (step 504). The parent mobile station then searches through a local database or other contact information to identify a name associated with the dialed telephone number (step 506). The parent mobile station displays a notification of the attempted call to the user of the parent mobile station (step 508). This notification preferably includes the dialed telephone number and, if available, the associated name of the third party. If no name is associated with the dialed number, the notification preferably indicates that no associated name is known.

The parent mobile station awaits from its user a timely instruction, which may be provided through command button options provided in the notification. Upon an instruction to cancel the outbound call (step 510), the outbound call is not permitted to be connected, and the parent mobile station informs the child mobile station that the call is canceled (step 514). Upon an instruction to permit the outbound call (step 512), the parent mobile station establishes a connection with the third party (through the wireless telecommunications network) (step 516) and with the child mobile station (over, preferably, a wireless LAN, PAN or Bluetooth connection) (step 518). Having set up communications with the third party and with the child mobile station, the parent mobile station relays voice communications between the called party and the child mobile station (step 522), such that the third party and the user of the child mobile station can communicate with one another over a voice connection (step 520). Preferably, the voice connection between the third party and the child mobile station approach a quality of service similar to that of conventional cellular telephonic communications. In different embodiments, the relaying of voice communications may take different forms. For example, in a VoIP system, the parent mobile station may operate as an IP proxy server for the child mobile station. The third party may or may not be made aware that it is communicating through a parent mobile station.

If no timely response is entered at the parent mobile station, the parent mobile station may perform a default action, which in different embodiments and/or different configurations may result either in the call being canceled or connected. The parent mobile station may determine that no timely response is received when, for example, no response is entered during the passage of a predetermined amount of time, such as 15 seconds, after the notification is provided.

2. An Inbound Call Method

In an exemplary method, a parent mobile station is used to exercise authority over inbound calls to an associated child mobile station. An outside caller, such as a third party calling over the public switched telephone network, dials a telephone number associated with a child mobile station. The public switched telephone network signals the wireless telecommunications network associated with the parent mobile station, and the wireless telecommunications network signals the parent mobile station of the inbound call.

Figure 7:
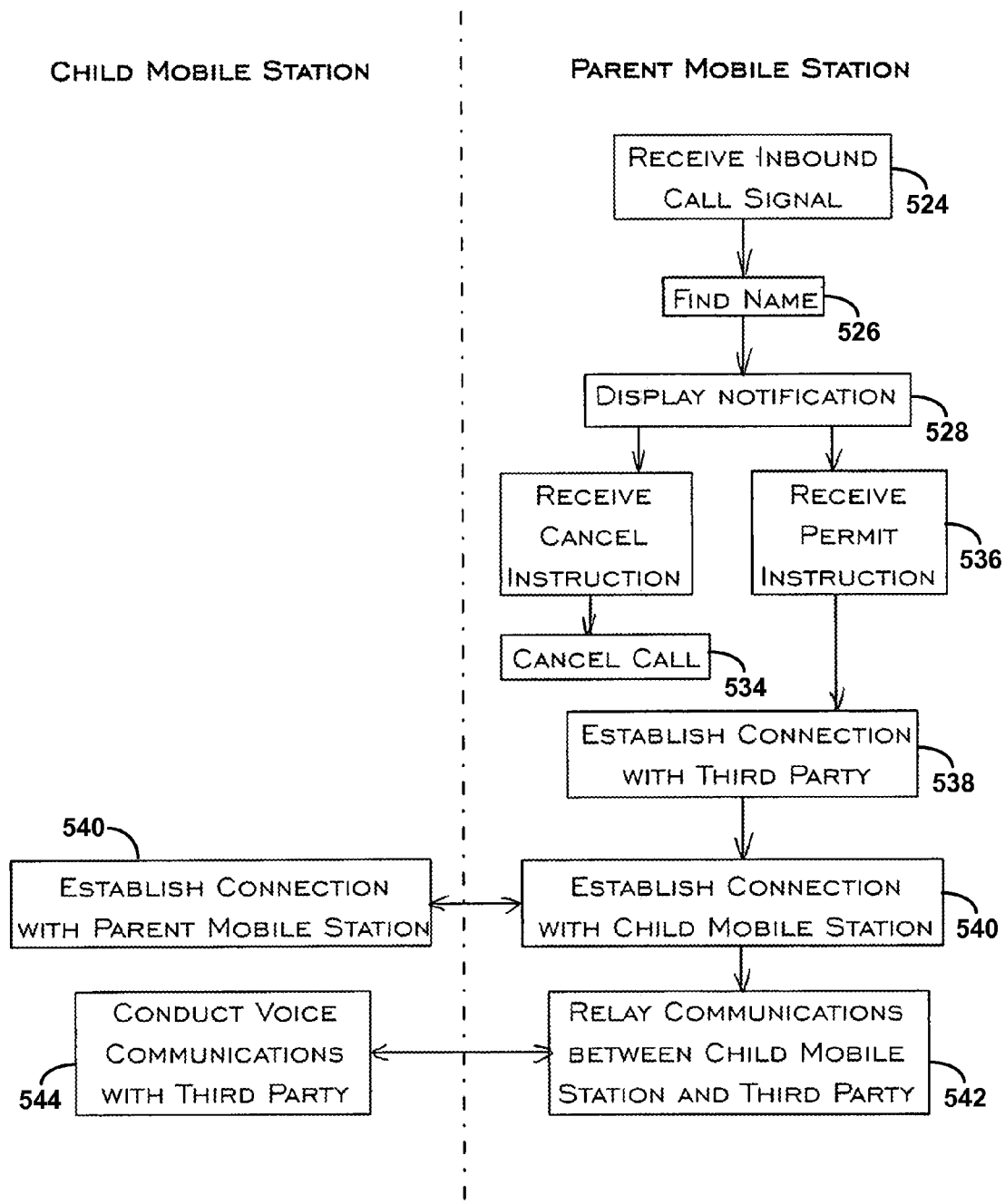
FIG. 7 illustrates a method performed by parent and child mobile stations in handling an inbound call.

As illustrated in FIG. 7, the parent mobile station receives the signal indicating an inbound call (step 524). Preferably, the signal includes information identifying the telephone number of the third party. The parent mobile station then searches through a local database or other contact information to identify a name associated with the third party caller's telephone number (step 526), and/or the parent mobile station receives CallerID information naming the caller (not shown). The parent mobile station displays a notification of the inbound call to the user of the parent mobile station. This notification preferably includes the third party caller's telephone number and, if available, the associated name. If no name is associated with the third party caller's telephone number, the notification preferably indicates that no associated name is known.

The parent mobile station awaits from its user a timely instruction, which may be provided through command button options provided in the notification. Upon an instruction to cancel the inbound call (step 530), the inbound call is not permitted, e.g. the parent mobile station does not pick up the inbound call (step 534). In different embodiments, or in response to different configurations, the child mobile station may or may not be informed that an inbound call was attempted, and the third party caller may or may not be notified that the call was canceled because of parental controls.

Upon an instruction to permit the inbound call (step 536), the parent mobile station establishes communications with the third party (step 538) and with the child mobile station (step 540). Having set up communications with the third party caller and with the child mobile station, the parent mobile station relays communications between the two (step 542), such that the third party and the user of the child mobile station can carry out voice communications with one another (step 544).

If no timely response is entered at the parent mobile station, the parent mobile station may perform a default action, which in different embodiments and/or different configurations may result either in the call being canceled or connected.

E. An Exemplary Multimedia Access Method

Figure 8:
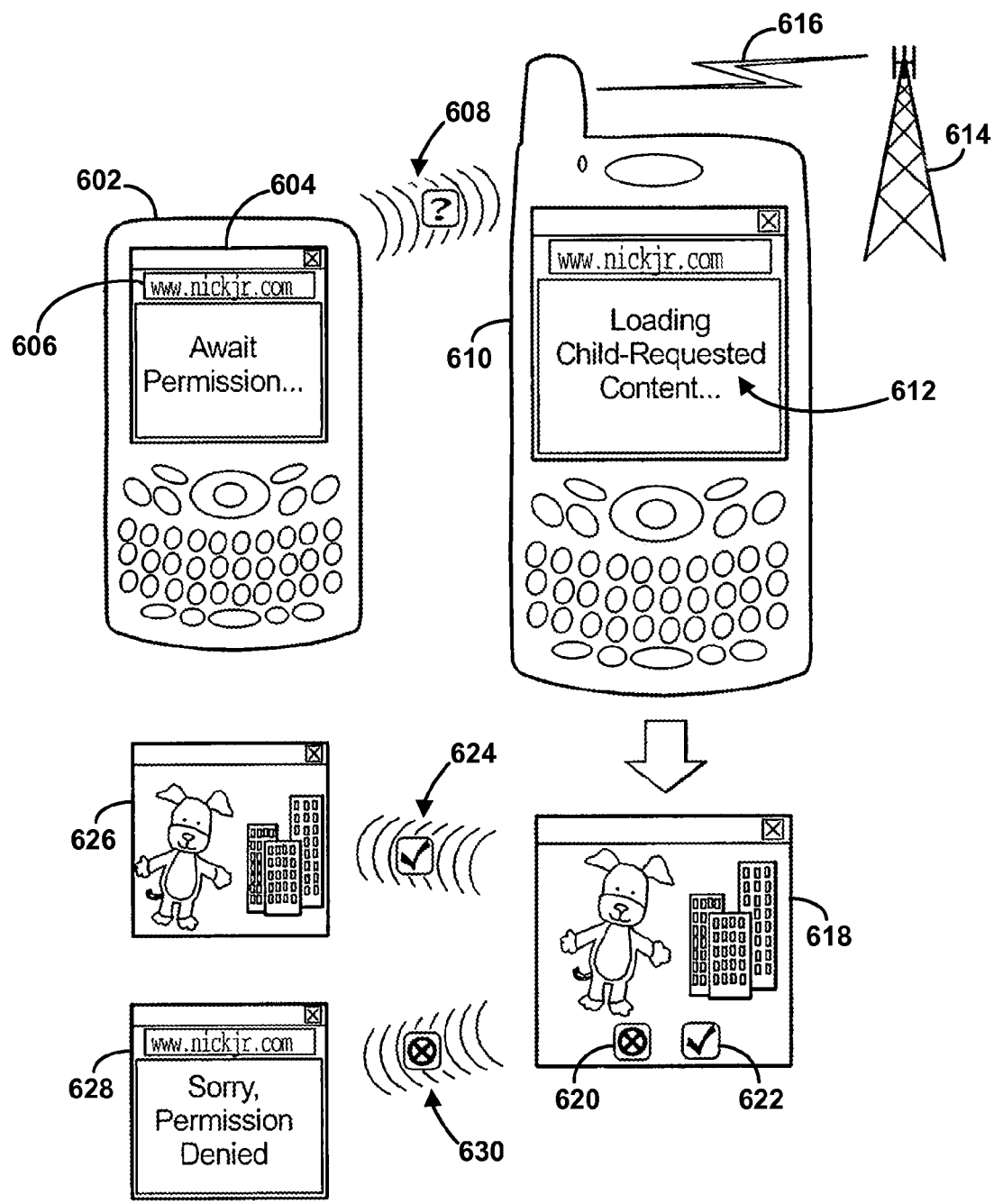
FIG. 8 illustrates a method performed by parent and child mobile stations in handling a child mobile station's request to retrieve content.

In the exemplary method illustrated in FIG. 8, a child mobile station 602 is provided with Web browser software with an open Web browser window 604. In a text box 606 of the Web browser window 604, a user of the child mobile station 602 enters a URL (uniform resource locator) of a Web site the child user would like to visit. The child mobile station 602 wirelessly sends this URL in a request 608 to an associated parent mobile station 610, preferably using a Bluetooth or wireless LAN link. A notification 612 is displayed for the user of the parent mobile station 610. The parent mobile station establishes a wireless data link 616 with a service provider 614, and the parent mobile station retrieves, from a content provider (such as a Web server, among other examples) the content addressed by the URL of the request.

Once the parent mobile station 610 has retrieved the child-requested content, the content is displayed in a browser window 618 of the mobile station. In this way the parent user can view the content, such as a Web page, before it is delivered to the child mobile station. The browser window 618 of the mobile station presents input options to the parent user, such as command buttons, to determine whether to block the content (button 620) or to approve the multimedia content for forwarding to the child mobile station (button 622).

If the content is approved, the content is sent by the parent mobile station 610 over a wireless link 624 to the child mobile station 624 and displayed in a browser window 626 (which may be a refreshed version of the browser window 604). If the content is not approved, the parent mobile station may inform the child mobile station 604 over a wireless link 630 that the content is not approved, or the parent mobile station may simply decline to provide any data to the child mobile station, which by default prevents successful viewing of the content. The child may be informed in a browser window 628 (which may be a refreshed version of the browser window 604) that permission to view the content has been denied.

In the example of FIG. 8, the parent mobile station 610 operates as a proxy server for the child mobile station 602, except that the parent mobile station displays selected content to a human user before such content is forwarded to the child mobile station, allowing the human user to make a real-time decision concerning access to the content. In a preferred embodiment, not all content requested by the child mobile station is required to be previewed in this way, rather, only requests relating to "blacklisted" content, or requests not relating to "whitelisted" content are displayed for preview by a human operator of the parent mobile station. More complex pattern matching, Bayesian, or other algorithms may be used to determine which requests will or will not be subject to preview at the parent mobile station. A determination as to what content will be previewed may be made based on the URL of the request (e.g., the URL may be consistent with adult-only sites), based on the data sent in response to the request (e.g., a JPEG file with a high percentage of flesh-tone pixels, or the presence of one or more keywords suggesting objectionable content), or on some weighted combination of the two.

If content at a particular URL or within a particular domain has previously been previewed and allowed by the parent user, subsequent attempts by the child user to view the content may proceed without requiring preview. Conversely, if such content has previously been previewed and blocked by the parent user, subsequent attempts by the child user to view the content may be blocked without requiring a preview. In some embodiments, a parent's response to particular previewed content may be supplied to an adaptive learning algorithm that determines whether similar content (e.g., content at the same or similar URLs, or content including similar characteristic words and phrases) will require parental previewing in the future. Inferences made from a parent user's previous responses may be just one factor among others for determining whether particular content requires previewing.

Some embodiments may operate as described in FIG. 8 with the addition of other command buttons, such as a button (not shown) displayed in the preview window 618 that corresponds to a "Not Now" choice. In such an embodiment, the selection of the "Not Now" button prevents the child user from accessing the requested content but does not mark the content as being inappropriate. For example, a parent user can select the "Not Now" button to prevent a child user from accessing a sports or entertainment Web site when the child user is supposed to be doing homework, but the URL of the requested Web site will not be "blacklisted," and it will not be provided to the adaptive learning algorithm as an example of inappropriate content. In such embodiments, the "Not Now" button may be paired with a "Never Allow" button (not shown), which the parent can use to identify content considered inappropriate. Content marked with the "Never Allow" button need not be previewed to the parent user in the future.

It is to be understood that a single Web page may be comprised of dozens of embedded resources, each addressed by a different URL. Preferably, the parent mobile station also retrieves these embedded resources for display to its human user. When the Web page as a whole is approved for viewing by the user of the parent mobile station, this approval may be deemed effective for each of the displayed resources. Because the embedded resources have been pre-fetched by the parent mobile station, any delay introduced by the need for human intervention at the parent mobile station is offset at least in part by the fact that the child mobile station can quickly retrieve needed resources locally from the parent mobile station, rather than over a distant network.

Although the example of FIG. 8 was described in terms of Web pages, it should be understood that other content retrievable over a network can be subjected to similar parental preview and control, including multimedia content. For example, when a child user attempts to download an MP3 or other audio file, the audio may be pre-played at the parent mobile station before the file is allowed to be forwarded to the child mobile station. As used herein, the verbs "preview" and "display" are not intended to be limited only to content that can be seen visually.

F. Alternative Embodiments

The modules, logic, and data storage elements described herein may be implemented through hardware, software, or a combination of hardware and software. Although the above examples help to elucidate the invention, other examples or variations on these examples are possible, and consequently the scope of the invention is limited only by the following claims.

The invention claimed is:

1. A system comprising a parent mobile station, wherein the parent mobile station comprises:

wireless communication circuitry capable of communicating (i) with a third party over a wireless telecommunications network and (ii) with an associated child mobile station;

a display;

authority control logic operative (i) to detect a request by the associated child mobile station to establish voice communications with a third party, the request including a telephone number; and (ii) to determine whether to permit or deny the voice communications with the third party; and voice communication logic operative, in response to a determination by the authority control logic to permit the voice communications, to relay the permitted voice communications between the third party and the child mobile station through the wireless communication circuitry the system further comprising the associated child mobile station, the child mobile station comprising (a) a keypad, (b) a microphone, (c) a speaker, and (d) child wireless communication circuitry capable of communicating with the parent mobile station, the child mobile station being operable, in response to a keypad input, to send to the parent mobile station the request to establish voice communications with the third party, the request including the telephone number of the third party, and the child mobile station further being operable to enable a voice connection between a user of the child mobile station and the third party, using the microphone and speaker as transducers, the voice connection being relayed through the parent mobile station.

2. The system of claim 1, wherein the child mobile station is a Part 15 device.

3. The system of claim 1, wherein the child wireless communication circuitry is not capable of transmitting radio signals at greater than one Watt equivalent isotropically radiated power.

4. The system of claim 1, wherein the child mobile station is not capable of direct communications with a base transceiver station.

5. The system of claim 1, wherein the child mobile station and the parent mobile station are operative to communicate with one another using a Bluetooth protocol.

6. The system of claim 1, wherein the child mobile station and the parent mobile station are operative to communicate with one another using a wireless LAN protocol.

7. The system of claim 1, wherein the authority control logic is operative, in response to the request by the child mobile station to establish voice communications with the third party, (i) to cause a notification identifying the third party to be displayed on the display, wherein the notification includes a request for a user input; and (ii) to make the determination of whether to permit or deny the voice communications with the third party based on the user input.

8. The system of claim 7, wherein the parent mobile station includes contacts data associating names and telephone numbers, and wherein the notification identifying the third party includes a name of the third party.

9. The system of claim 1, wherein the parent mobile station further comprises (a) a parent mobile station keypad, (b) a parent mobile station microphone, and cc) a parent mobile station speaker, the parent mobile station further being operable, using the parent mobile station microphone and parent mobile station speaker as transducers, to enable a voice connection between a user of the parent mobile station and the third party.

10. A system comprising a parent mobile station, wherein the parent mobile station comprises:

wireless communication circuitry capable of communicating (i) with a third party over a wireless telecommunications network and (ii) with an associated child mobile station;

a display;

authority control logic operative (i) to detect a request by the associated child mobile station to establish voice communications with a third party, the request including a telephone number; and (ii) to determine whether to permit or deny the voice communications with the third party; and voice communication logic operative, in response to a determination by the authority control logic to permit the voice communications, to relay the permitted voice communications between the third party and the child mobile station through the wireless communication circuitry, wherein the parent mobile station further comprises (a) a parent keypad, (b) a parent microphone, and (c) a parent speaker, the parent mobile station further being operable, in response to a keypad input, using the microphone and speaker as transducers, to enable a voice connection between a user of the parent mobile station and the third party; and wherein the system further comprises the associated child mobile station, the child mobile station comprising (a) a child keypad, (b) a child microphone (c) a child speaker, and (d) child wireless communication circuitry capable of communicating with the parent mobile station the child mobile station being operable, in response to a keypad input, to send to the parent mobile station the request to establish voice communications with the third party, the request including the telephone number of the third party, wherein the system is operable, in response to a determination by the authority control logic to permit the voice communications, to enable a voice connection between a user of the child mobile station and the third party, using the microphone and speaker as transducers, the voice connection being routed through the parent mobile station.

11. A system comprising a parent mobile station, wherein the parent mobile station comprises:

wireless communication circuitry capable of communicating (i) with a content provider over a wireless telecommunications network and (ii) with an associated child mobile station;

a display;

authority control logic operative (i) to detect a request by the associated child mobile station to retrieve content from the content provider; (ii) to cause the requested content to be retrieved by the parent mobile station; (iii) to cause the requested content to be displayed on the parent mobile station; (iv) to cause a request for user input regarding the requested content to be displayed on the parent mobile station; and (v) based on the user input, to (a) cause the wireless communication circuitry to send the content to the child mobile station, or to (b) prevent the content from being sent to the child mobile station.

12. The system of claim 11, further comprising the associated child mobile station, the child mobile station comprising:

a display;

child wireless communication circuitry capable of communicating with the parent mobile station;

the child mobile station being operable, in response to user input, to send to the parent mobile station the request to retrieve content from the content provider;

the child mobile station further being operable to display the content if the content is sent to the child mobile station by the parent mobile station.

13. The system of claim 12, wherein:

the child mobile station and the parent mobile station are operable to communicate with one another through a protocol selected from the group consisting of a wireless local area network protocol and a wireless personal area network protocol; and wherein the child mobile station is not operable to communicate using a wireless telecommunication protocol.

14. A method of operating a parent mobile station, wherein the parent mobile station is associated with at least one child mobile station, the method comprising:

receiving, from a wireless telecommunications network, a plurality of signals identifying inbound calls;

for at least a first one of the inbound calls, determining that the first inbound call is destined for the parent mobile station, and thereafter enabling the parent mobile station to connect with the first inbound call;

for at least a second one of the inbound calls, determining that the second inbound call is destined for the child mobile station, determining that the child mobile station is permitted to receive the second inbound call, and thereafter relaying voice communications between the child mobile station and the wireless telecommunications network, through the parent mobile station, to connect the second inbound call with the child mobile station; and for at least a third one of the inbound calls, determining that the third inbound call is destined for the child mobile station, and determining that the child mobile station is not permitted to receive the third inbound call.

15. The method of claim 14, further comprising, after determining that the child mobile station is not permitted to receive the third inbound call, canceling the third inbound call.

16. The method of claim 14, further comprising, after determining that the child mobile station is not permitted to receive the third inbound call, enabling the parent mobile station to connect with the third inbound call.

17. The method of claim 14 wherein determining that the child mobile station is permitted to receive the second inbound call includes displaying, on the parent mobile station, information about the second inbound call, and thereafter identifying a user response, the user response being selected from the group consisting of (i) taking action to permit the call and (ii) not taking action to cancel the call.

18. The method of claim 14 wherein determining that the child mobile station is not permitted to receive the third inbound call includes displaying, on the parent mobile station, information about the third inbound call, and thereafter identifying a user response, the user response being selected from the group consisting of (i) taking action to cancel the call and (ii) not taking action to permit the call.

19. The method of claim 14, further comprising:

receiving, from the child mobile station, a plurality of requests to make outbound calls, at least some of those requests including a telephone number;

for at least a first one of the requests including a first telephone number, determining that the child mobile station is permitted to make a first outbound call, and thereafter routing voice communications between the child mobile station and a third party at the first telephone number; and for at least a second one of the requests including a second telephone number, determining that the child mobile station is not permitted to make a second outbound call.

* * * * *